April 26, 1960   S. R. SCRUBY ET AL   2,934,223
BIN

Filed Oct. 21, 1957   6 Sheets-Sheet 1

INVENTOR.
ROBERT M. HOWARD
STANLEY R. SCRUBY
BY Ralph L. Klugger
ATTORNEY

April 26, 1960 S. R. SCRUBY ET AL 2,934,223
BIN
Filed Oct. 21, 1957 6 Sheets-Sheet 6

INVENTOR.
ROBERT M. HOWARD
STANLEY R. SCRUBY
BY
*Ralph L. Dugger*
ATTORNEY

United States Patent Office 2,934,223
Patented Apr. 26, 1960

2,934,223
BIN

Stanley R. Scruby and Robert M. Howard, Minneapolis, Minn., assignors to International Milling Company, Minneapolis, Minn., a corporation of Delaware Application October 21, 1957, Serial No. 691,313

9 Claims. (Cl. 214—17)

This invention relates to improved bins and more particularly to improvements in bins that are used for the sanitary storage of powdered or granular foodstuff materials. In many establishments such as bakeries, flour mills, sugar refineries and the like, large quantities of foodstuff materials such as flour, sugar and the like are stored, handled or utilized. Historically, it has been the practice to keep such materials in bags, cartons or barrels and to handle these containers individually when desiring to store, ship or utilize the contents thereof. Such methods of storage are disadvantageous because of the necessity of handling the commodity in small amounts; because of the possibility of infestation due to insects, mice, rats and the like and because of the constant possibility that the container may be fractured in the handling and that the contents thereof contaminated as to make its use impossible.

In the more modern establishments where foodstuff materials are used there is provided bin capacity in which the foodstuffs are placed. Such bins must be capable of retaining the material in dry condition and guarded against infestation from insects, rats, mice and the like. Ordinary powdered or granular materials that are not used for foodstuffs do not require sanitary handling and constant inspection of the bins, but wherever foodstuff materials are involved, it is necessary that the bin be of such construction that it may be inspected completely over the entire exterior surface and so constructed as to permit inspection of such surface. The bin must likewise be capable of interior cleaning when the bin is empty. Finally, the bin construction must be capable of being filled and emptied without any physical or manual labor on the part of an operator, this being required so as not only to reduce the labor cost but also to reduce the possibility of contamination of the foodstuff product.

While the present invention is primarily directed to bin construction or the handling of foodstuff materials, improved bins of the present invention may also be used for containing non-foodstuff materials, or animal foodstuff material where costs permit.

It is an object of the present invention to provide an improved bin construction. It is another object of the invention to provide an improved bin capable of being manufactured at low cost and yet so constructed as to permit the emptying thereof without any labor.

It is another object of the invention to provide an improved bin wherein the bin may be made of multiple or modular units and so constructed as to permit the capacity of the bin to be varied by multiples when it is designed. It is another object of the invention to provide an improved bin construction wherein the entire weight of the bin and the bin contents are supported by continuous beams which in themselves also form the bottom of the bin.

It is a further object of the invention to provide an improved bin bottom.

It is another object of the invention to provide an improved bin wherein the bottom of the bin is composed of one or more continuous beams supported at a plurality of points intermediate the length of the beam and so constructed so that the beams, in cooperation with the contiguous beams, form a self-emptying bottom for the bin.

Other objects of the invention are those inherent in the apparatus herein illustrated and described.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein

Figure 1:
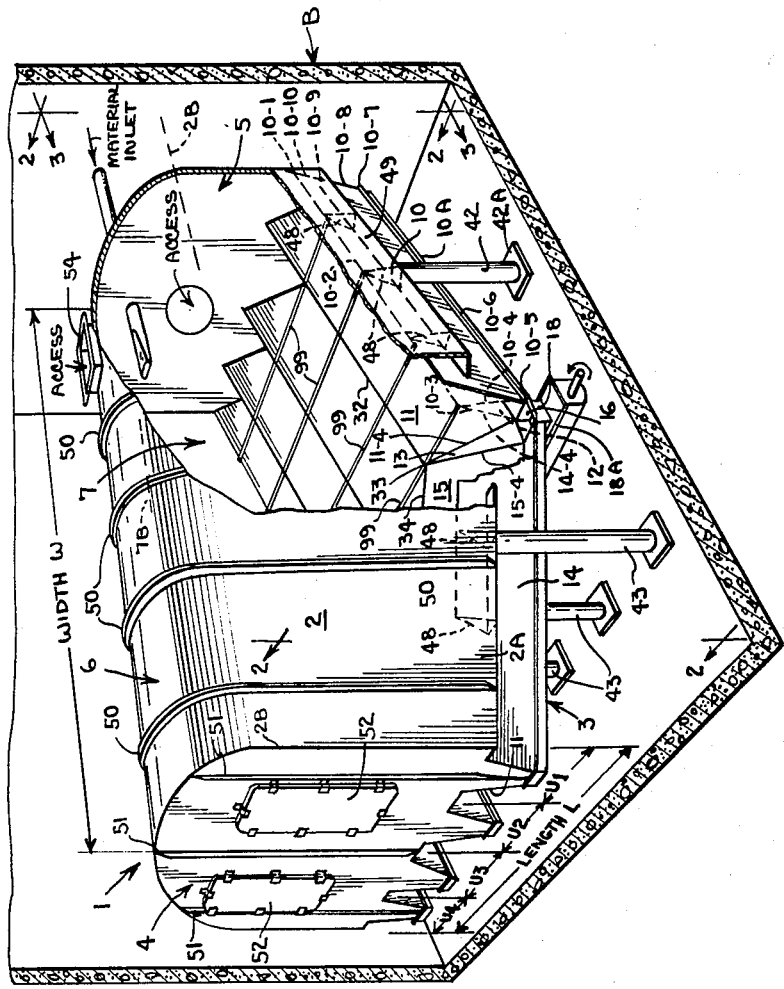
Figure 1 is a perspective view of an exemplary form of bin made according to the present invention. This perspective view illustrates the bin in a building wherein the building is broken away, certain portions of the bin also being broken away for better illustration of the subject.
Figure 2:
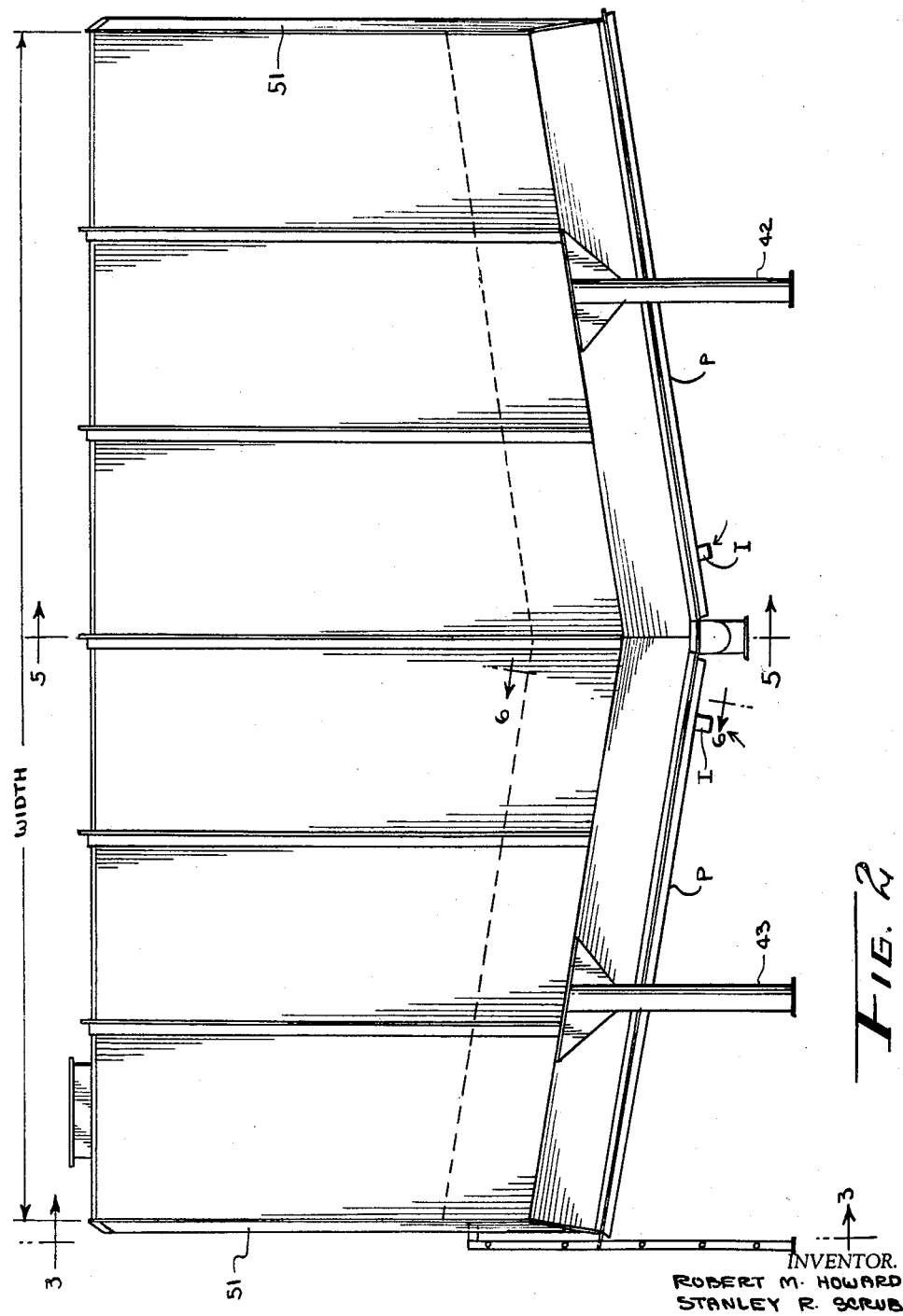
Figure 2 is an elevational view of the bin illustrated in Figure 1, this view being taken in the direction of arrows 2—2 shown in Figures 1 and 3.
Figure 3:
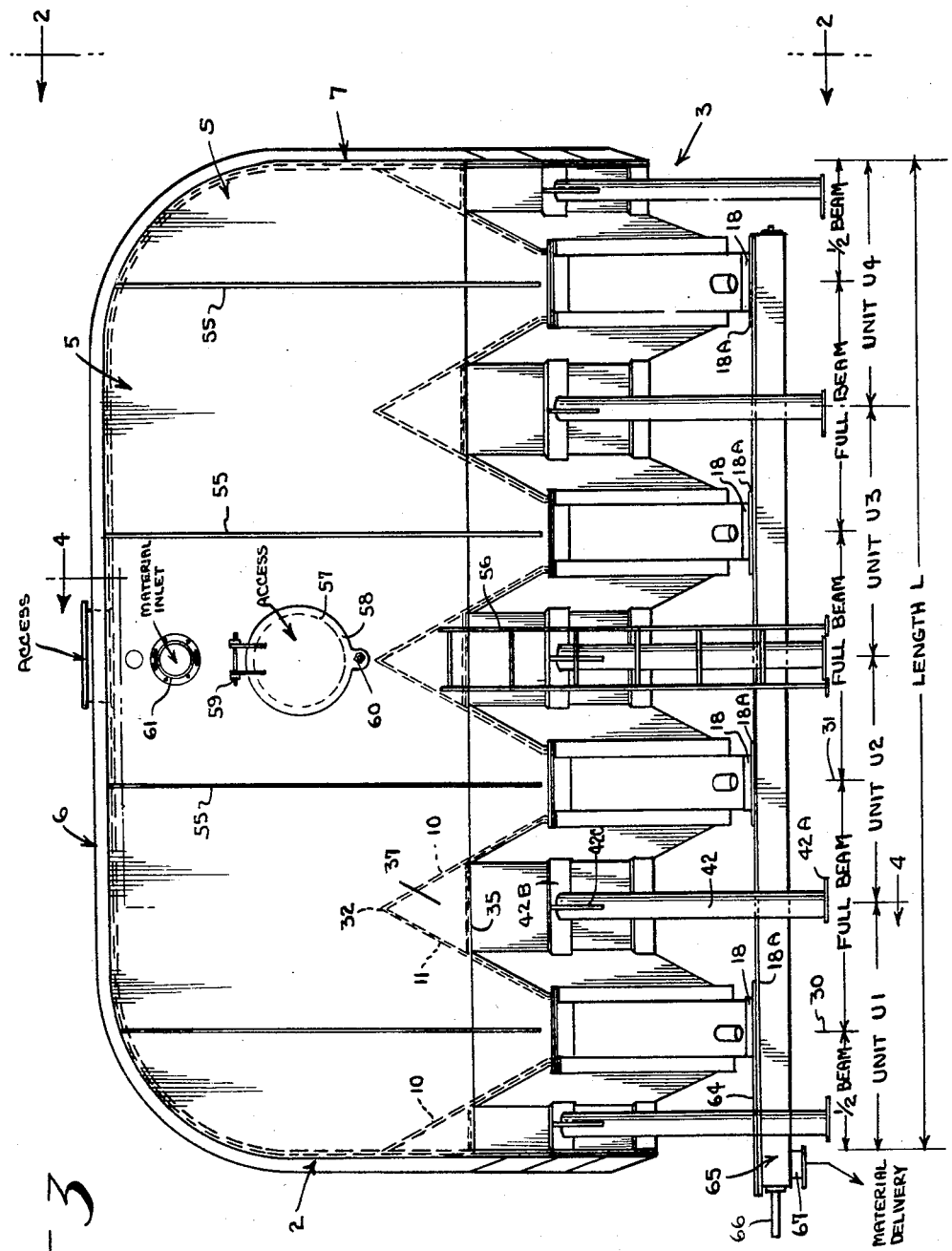

Figure 3 is a side elevational view taken in the direction of arrows 3—3 of Figure 2. In Figure 3 the side which is illustrated is the far side, opposite to that shown in Figure 1. The arrows 3—3 are also shown in Figure 1 to illustrate the direction in which this view is taken.

Figure 4:
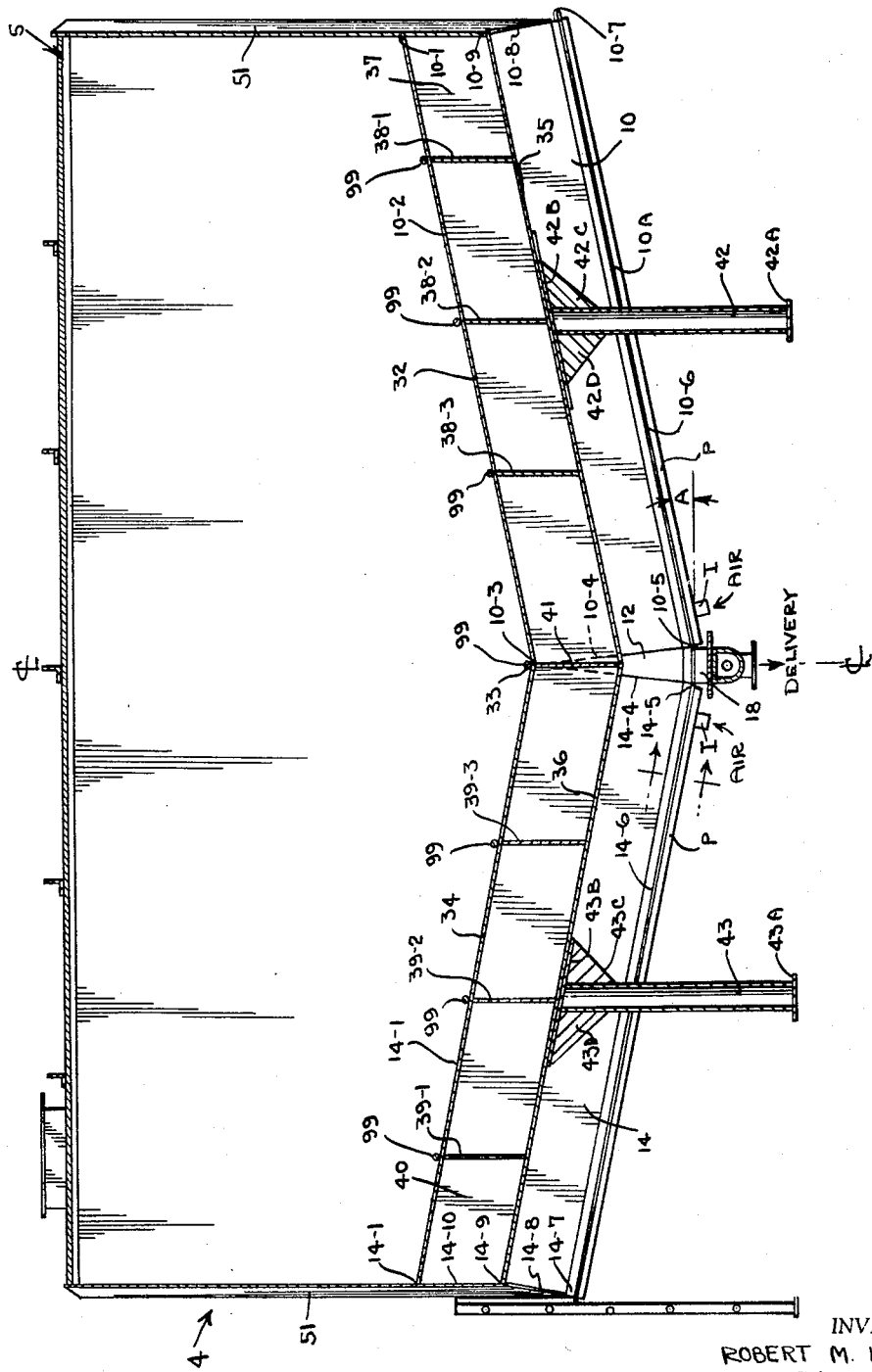

Figure 4 is a transverse sectional view taken along the line and in the direction of arrows 4—4 of Figure 3.

Figure 5:
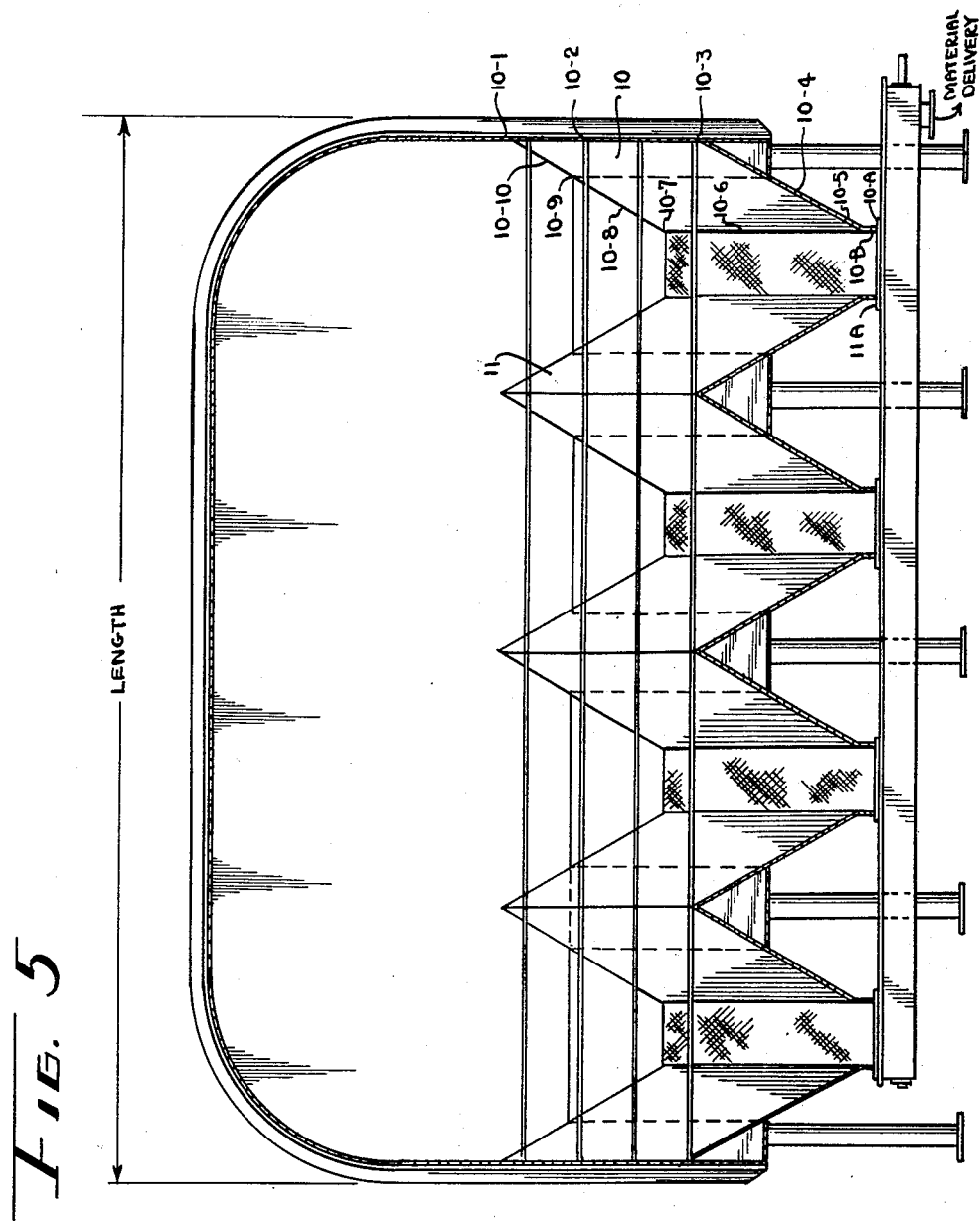

Figure 5 is a longitudinal sectional view taken along the line and in the direction of arrows 5—5 of Figure 2.

Figure 6:
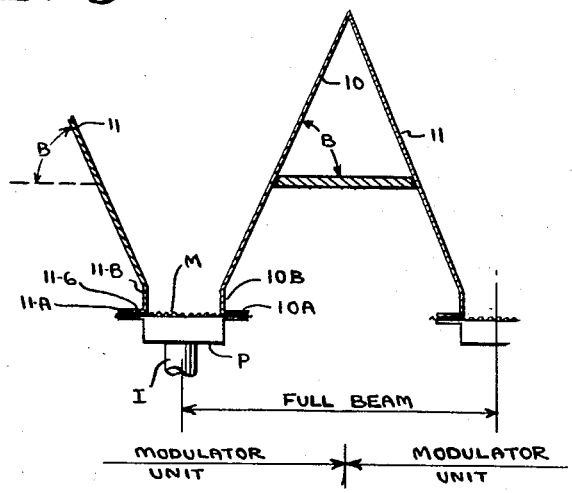

Figure 6 is an enlarged fragmentary sectional view of the adjacent slope plates of two contiguous beams and the airslide conveyor which connects the plates to form the complete bottom.

Figure 7:
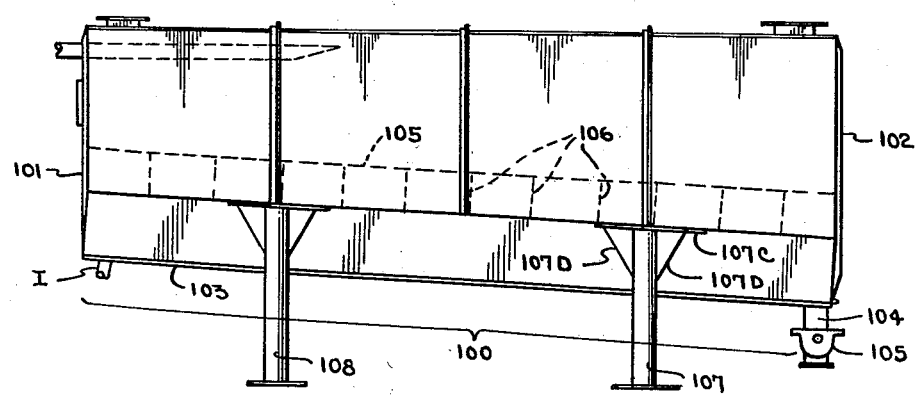

Figure 7 is an end elevational view of a modified form of exemplary bin embodying the invention.

Throughout the drawings the same numerals refer to the same parts.

Referring to Figure 1, at B there is generally shown a building B in which a bin such as that herein illustrated may be placed. The bins of the present invention are of entirely closed construction and there is no necessity that the bins be housed within a building, even where human foodstuff materials are being stored. But in many instances, as in connection with bakeries, mills and refineries the proprietor may desire to provide simple weather protection for the exterior surface of the bin in order that inspection and sanitary maintenance may be carried out under comfortable conditions for the labor employed. Hence in this illustration the bin of the present invention is shown within a building structure but it will be understood that there is no requirement that the bin be thus housed.

The bin has a width W and a length L as shown by the dimension lines in Figure 1. The width may be longer than the length, because according to the present invention the length of the bin depends upon the number of modular units that are employed along side of each other to compose the length of the bin. The length of the bin will therefore depend upon the capacity desired and may be either short and hence composed of only several units, or long and composed of many units. In the bin illustrated in the drawings there are four such modular units, U1, U2, U3 and U4. As herein explained in detail, each modular unit forms a bottom portion of the bin and each modular unit is self-emptying to a lowermost line along the bin, which can be along the longitudinal center line of the bin as shown in Figure 1 or at one side, as shown in Figure 7.

Each modular unit U1, U2 and U3 and U4 in the illustrated form of bin shown in Figures 1–6 is composed of a part of two adjacent contiguous beam sections and the bin bottom, thus composed of several modular units attached to the end walls and is covered over to complete the bin enclosure.

Referring to Figure 3 and particularly to the dimensions shown at the bottom of this figure, it will be noted that structurally the bottom of the bin is composed of a half-beam at each end and a plurality of full beams in between. Each full beam structure is composed of two slope plates. The half-beams are composed of one slope plate and an end wall, taken together. Each modular unit is composed of adjacent slope plates of adjacent beams and a conveyor section. The modular bottom units of the bin and the beam structures accordingly reach transversely across the entire width of the bin. Each beam is supported by two posts which thus structurally provides a continuous beam structure transversely across the bin.

Referring now to Figure 1 the bin which in entirety is designated 1 has a front surface 2, a bottom generally designated 3, a left side wall generally designated 4, a right side wall generally designated 5, a curved top 6, and a rear wall generally designated 7. Referring particularly to Figures 1 and 3, the bottom generally designated 3 is composed of, in this instance, four modular bottom units U1 through U4. These are identical and therefore only one need be described in detail. Referring to unit U1, this unit is composed of a slope plate composed of three plates 10, 12 and 14 welded or otherwise fastened co-planar edge-to-edge, and which taken together, form the slope plate which is closest to the front wall 2. The opposite slope plate is likewise composed of three plates 11, 13 and 15 also welded or otherwise fastened co-planar edge-to-edge and which, taken together form the other side of the modular unit U1. The slope plates and the modular floor unit which they compose, slant down toward the longitudinal center line CL (or vertical longitudinal center plane) of the bin as shown in Figures 1 and 2. This is done to provide a flow of material to the center of the bin. In Figure 7, the flow is to one side.

The slope plate 10—12—14 is preferably made of sheet steel, and for sanitation may be stainless steel. The plates 10 and 14 are the same pattern, but one is "reversed," and they are nearly rectangular in shape, the specific pattern being pointed out latter. The plates 10 and 14 are joined by a small triangular gusset plate 12, which is shown by dotted lines in Figure 1. This gusset is the same shape as plate 13, which is shown in full lines in Figure 1.

Similarly the plates 11 and 15 which are the cooperating slope plates of modular unit U1 are the same pattern as plates 10 and 14 and they are joined by the triangular gusset plate 13.

The exact pattern of the plates 10, 11, 14 and 15, all of which are the same, is illustrated in Figures 1 and 4. Thus beginning at one corner 10-1 the plate 10 extends along a straight line 10-2 to the corner 10-3 and thence along the straight line 10-4 to the corner 10-5 thence along the lower edge 10-6 to the corner 10-7, thence along a line 10-8 (which is normal to line 10-6), to the point 10-9 where it intersects the sidewall plane and where the direction changes slightly, see Figure 4, and thence continuing along the straight line 10-10 to the starting point 10-1. Each of the plates 10 and 11 is the same pattern in this illustrated bin, except that one is toward the front and the other is toward the back of the bin, since they are positioned so as to form a V-shaped trough, this trough slopes as shown in Figure 1 toward the center line CL of the bin. Similarly plates 14 and 15 are identical in shape except that one is toward the front of the bin and the other is toward the back of the bin.

The composite slope plates 10—12—14 and 11—13—15 form a V-shaped trough which due to the plan shape of the plates, likewise slopes downwardly toward the longitudinal center line CL of the bin. The plates 10 and 14 are attached by the small gusset 12 which is of triangular shape, the plates being welded along the lines 10-4 and 14-4, edge-to-edge. Similarly the plate 11 is welded edge-to-edge along the line 11-4 to the gusset 13 which is in turn welded along the line 15-4 to the plate 15. The three plates 10, 12 and 14 form an integral unit that extends from the side 4 to the side 5 of the bin. Similarly the three plates 11, 13 and 15 form an integral unit and extend from the side 4 to the side 5. The transverse appearance of the bin is shown in Figures 2 and 4. In this connection it may be noted that the side 5 is vertical but at the lower portion of the trough formed by the plates 10 and 11 the side wall bends out at the level 10-9 sufficiently so that the portion 10-8 is substantially at right angles to the bottom line 10-4 of the slope plate. Similarly, the side plate 4 bends at the level 14-9 so that the portion 14-8 is substantially at right angles to the bottom edge 14-6 of the slope plate 14. The angularity of the line 10-4 with reference to the line 10-6 (and also with reference to the line 10-2) depends upon the degree of slope toward the center, which is the angle A as shown in Figure 4. The degree of this slope is determined by the particular material being handled and by the ability of the air slide to handle these materials. It is preferable that the slope be in the range from 5 to 20 degrees and for manufacturing convenience and cost reduction should be the same at each side from the center, although this need not be so.

The lower edge lines 10-6, 14-6 and the corresponding edges of plates 11 and 15 are shaped as shown in Figure 6, to provide a vertical portion 10B and 11B and an outwardly extending flange. The air slide fabric M is placed against these flanges and is clamped by the air pressure or trough flanges and held in place by bolts, not shown.

The slope of the plates 10 and 11 with reference to the horizontal (angle B, Figure 6) is preferably the same and in the range of 45 to 75 degrees with reference to the horizontal. Each of the plates 10 and 11 is flat except at the lower edge 10-6 where there may be provided a short downwardly extending flange 10B which is then bent outwardly to substantially horizontally at flange 10A. The outwardly extending flanges 10A and 11A are covered by a porous membrane M which is held in place by a trough shape pan P. When air is introduced at the inlet I under slight pressure the air permeates the membrane M and enters the powdered material inside of the bin which accordingly becomes a solid-air fluidized mess which flows readily. Thus stretching across and bridging the lower terminal flanges 10A and 11A of the modular unit U1 there are provided the air slide units P—P (see Figure 4) each of which has an air inlet I. The air slide units, per se, do not form a part of this invention except as they are incorporated herein to form the bottom of the trough shaped modular unit extending across the bin. Any other convenient form of conveyor unit for closing the space between the plates 10—12—14 and 11—13—15, and constructed so as to move the material from the sides toward the discharge point of the trough may be substituted for the air slide conveyors.

The particular shape of the triangular gussets 12 and 13 which join the adjacent slope plates 11—15 and 10—14 respectively, is determined by the amount of downward slant of the resultant trough toward the centerline of the bin. The gussets 12 and 13 are cut to fit.

The conveyors P—P terminate at approximately the lower ends of the lines 10-4, 11-4, 14-4 and 15-4, and accordingly there is a short space between the conveyor at the right side of the bin and the conveyor at the left side of the bin adjacent the centerline; said short space being the width of the gussets 12 and 13 along their lower edges. This results in a small rectangular opening 16 in the trough at the centerline and we prefer that a short rectangular tube be welded in so as to extend down slightly below the level of the conveyors P—P. This short tube is shown at 18 for the modular unit U1.

Each of the modular units U1 through U4 is similar and therefore need not be described further, except with reference to the beam structure, which is composed of the adjacent plates of the modular units, now to be described. Extending from the transverse centerline 30 of the modular bottom unit U1 to the transverse centerline 31 of the modular unit U2, may be considered as one full beam which is constituted by portions of these units. This full beam extends transversely of the bin between the sides from sides 4 and 5. Thus the slope plates 10—12—14 which constitutes that part of the modular unit U2 which is toward the front 2 of the bin, and the slope plates 11—13—15 of the modular unit U1 extend upwardly until they touch at the edge 32. This edge extends as a ridge across the bin, as shown in Figures 1 and 4. Thus the ridge 32 starts at sidewall 5 and extends as a straight line to the crossing point 33 which is at the vertical longitudinal center plane of the bin and thence up along the straight line 34 to sidewall 4. The slope plates 10—12—14 and 11—13—15 are welded together along this line 32—34 and the line weld is ground smooth and sharp so as to discourage lodging of foodstuffs along the weld which thus forms a sharp ridge. Then as a part of the full beam structure, between the slope plates 10 and 11 (and similarly between the slope plates 14 and 15) there is welded in another plate 35 (see Figures 3, 4 and 6). The plate 35 begins at the level of the point 10–9 (see Figure 4) and extends substantially parallel to the ridge 32 to the longitudinal center plane of the bin where it is joined, end-to-end with the similar plate 36 which extends across between the slope plates 12 and 14 and parallel to ridge 34. Plate 36 terminates at level 14–9. The slope plate 10 of unit U2 and 11 of unit U1 and the plate 35 form a triangular space 37 (see Figure 4) and advantage is taken of this according to the present invention by placing in this triangular space at intervals a plurality of stiffening gussets 38–1, 38–2 and 38–3 between the slope plates 10 and 11, and similarly stiffening gussets 39–1, 39–2 and 39–3 are provided in the triangular space 40 which is formed above the plate 36 and between the slope plates 12 and 14. A stiffening gusset may also be provided at 41 along the center plane of the bin.

The load in a bin is by no means uniformly distributed for each square foot of plan area of the bin and variations in load must be accepted by the structure of the bin. According to the present invention, the slope plates 10—12—14 of one modular unit and the slope plates 11—13—15 of the next adjacent modular unit and the plates 35—36 together with the stiffening gussets 38–1 through 38–3 and 39–1 through 39–3 and stiffening gusset 41 form a box-beam of great strength. This beam slopes down at the center plane of the bin, is "continuous" across the width of the bin, and is supported by two posts 42 and 43, these posts being located at a position substantially half way between the sides of the bin and the center plane of the bin. Thus the post 42 is positioned about half way between the side 4 and the centerplane CL of the bin and the post 43 is similarly placed about half way between the side 5 and the centerplane of the bin. Each post is provided with a foot plate as at 42A and a top plate as at 42B the top plate being extended and supported by the gussets 42C and 42D so as to distribute the load carrying properties of the post over a wide area of the plate 36 which the plate 42B contacts.

As a whole the bin will be supported on two lines of posts 42 and 43, there being provided one post for each end of each full and half-beam structure. Each of the posts 42 and 43 may be considered as supporting its half of the box-beam.

At the front and the back of the bin there are provided what is essentially a "half-beam" thus the front wall 2 of the bin extends down at 2A as shown in Figure 1 to a level which is the same as the level of the plates 35 and 36 in Figure 4 and triangular gussets which are "half-gussets" are provided at 48—48 spaced from each other in exactly the same manner as the spacing shown for Figure 4. The lower edge of the front wall 2 of the bin and the adjacent slope plate 10—12—14 and the closure plate 49 or 50 and the stiffening gussets 48 accordingly form a half-box-beam which supports the front of the modular unit 1 in precisely the same way that the full beam supports the adjacent slope plates of modular units U1 and U2. Thus at the front and rear of the bin there are provided half-beams as shown by the dimensional arrows in Figure 3 and between each of the units U1 and U2, units U2 and U3 and between the units U3 and U4, the structure constitutes a full beam unit as described.

The front wall 2 of the bin extends vertically to the level of the line 2B—2B but above the level of the line 2B the front plate 2 curves smoothly to join and form the top 6. The top 6 continues and curves down at the back and at the level of the line 7B—7B, the top 6 joins the rear wall 7. The front 2, top 6 and rear wall 7 are reinforced at spaced intervals by a plurality of stiffening angles 50—50 which are shaped to conform with the vertical front and back walls, the top and the curved connections between them.

The side walls 4 and 5 are provided with stiffening angles 51, and may if desired be provided with one or more access doors as shown at 52—52 for front wall 4. These are held in place by clips suitably placed or attached in any convenient fashion so that they may be readily removed. The top 6 of the bin is preferably provided with an access or material delivery opening 54 which if not used for introducing material into the bin, is provided with a removable cover plate. In the drawings opening 54 is shown open but it will be understood that it is either covered or connected to material inlet. The location of the entrance 54 can be any place along the top of the bin and several such access or material delivery units 54 may be provided if desired. The right side of the bin, namely the wall 5, is illustrated in Figure 1 and more specifically illustrated in Figure 3. This wall is likewise provided with vertical stiffening gussets 55. In addition there is provided a ladder 56 leading to an access opening 57 which is covered by the access door 58. The door 58 is hinged at 59 and held closed by the bolt 60. A material delivery inlet tube is provided into the bin at 61. Air connections are made at the inlets I to each of the air slide form of conveyors P—P that are used.

At the level of the flange 18A from each of the delivery tubes 18 on each modular bottom and conveyor unit across the bin there is connected what is the top surface 64 of a conveyor generally designated 65. The top 64 is provided with openings to which the flanges 18A are attached so that the material delivered down through the tubes 18 will fall directly into the conveyor 65. As illustrated the conveyor 65 is of the screw type and is provided with an operating shaft 66 which draws the granular or powdery material to a delivery outlet 67. An air slide unit may be substituted for the conveyor 65.

As shown in Figures 1 and 4, a plurality of the rods 99 extend from the front 2 to the back 7 along the level of the crests of ridges 32 and 34.

In Figure 7 the construction of the bin is such that the bottom shown generally over the bracket 100 forms a generally slanting plane with the highest portion of the bottom at the left side 101 of the bin and the lowest portion of the bottom at the right side 102 of the bin The bin shown in Figure 7 may be considered as simply one half of a bin such as illustrated in Figures 1–6 from either side to the centerplane CL of the bin. As a result each of the modular trough shaped bottom units extends as a straight trough of uniform cross section from the left side 101 to the side 102 slanting downwardly at a uniform angle from the left to the right side. Each of the trough units is constructed similarly to that shown in Figure 1 and is provided with an air slide conveyor 103 which has an air inlet I and an air slide conveyor P, delivers at 104 into a conveyor 105 extending under the delivery ports 104 of the adjacent modular trough shaped unit of which the bottom 100 is composed. In this bin construction as in that illustrated in Figures 1–5 the adjacent slope plates of the successive modular trough shaped units are connected together at their ridge lines 105 (corresponding to ridges 32 or 34 of the units shown in Figures 1–6) and plates 106 are used to connect these slope plates intermediate 105 of the slope plates and the conveyor delivery port 103 and a plurality of gussets 106 are included for stiffening purposes. In this form of bin two lines of posts 107 and 108 are also used each being provided with a wide top plate as at 107C adequately supported by gussets 107D by which the support of the post is delivered over a comparatively wide area on the plate 106 which with the adjacent slope plates of the modular trough shape units forms a box-beam extending transversely from one side to the other of the bin bottom.

As many widely apparently different embodiments of this invention may be made without departing from the spirit and scope thereof, it is to be understood that we do not limit myself to the specific embodiments herein.

What we claim is:

1. A bin for the storage of dry pulverized materials having an access port, a bottom composed of a plurality of modular units positioned contiguous and parallel, and extending from one side to the other of the bin, each modular unit composed of a pair of spaced opposed, cooperating slope plates, each of which extends from one side to the other across the width of the bin, said slope plates being shaped that the length of each slope plate extending from side-to-side in respect to the bin slants downwardly to a delivery end, the said slope plates being slanted upwardly and away from each other, and a modular unit conveyor connected to the lower edges of the slope plates to form a closed unit of trough shape, said conveyor having a downwardly delivering outlet at said delivery end, the contiguous slope plates of successive modular units of the bottom being connected together along their upper edges and plate means connecting said contiguous slope plates of successive modular units together at a level between their upper and lower edges to form a box beam of triangular cross-section extending substantially the length of the slope plates from side-to-side across the bin, at least two spaced posts connected to said beam and forming a support therefore, and a top on said bin.

2. The bin specified in claim 1 further characterized in that each modular unit slopes downwardly toward a center plane longitudinal in respect to the length of the bin and modular unit conveyors are provided for each modular unit for conveying material toward said center plane and the delivery is positioned at substantially said center plane.

3. The bin specified in claim 1 further characterized in that each modular unit trough extends in a straight line transversely in respect to the bin from a higher level at one side of the bin to a lower level at the other side of the bin and one modular unit conveyor is provided for each modular unit for delivering material along the length of the trough from the higher to the lower end and said downwardly delivering opening is provided at one side of the bin.

4. The bin specified in claim 1 further characterized in that tie bars are connected between the front and back walls of the bin at approximately the level of the upper edges of said slope plates.

5. A bin of the type specified in claim 1 further characterized in that an inlet for delivering solid material is provided at one side wall of the bin and access openings are provided in another wall of the bin at a level above the highest portion of the slope plates of said modular units.

6. A bin for the dry and sanitary storage of edible pulverized materials having a bottom composed of a plurality of modular units positioned contiguous and parallel to each other and extending from one side to the other of the bin, each such modular unit being composed of a planar slope plate having substantially rectangular left and right planar portions extending downwardly from the sides of the bin toward the longitudinal center plane of the bin, said rectangular right and left slope plates being connected together by a co-planar gusset plate, the slope plates of each modular unit having their lower edges extending parallel to each other and spaced apart, said edges being provided with outwardly extending flanges, and right and left modular conveyor means forming a box closure connected to the flanges along the bottom edges of each of the right and left slope plates, the delivery edge of said conveyors being at substantially the center plane of the bin and spaced apart from each other so as to form a downwardly delivering outlet opening, the upper edges of the slope plates of successive modular contiguous units being connected to form a narrow ridge which discourages collection of material thereon, and upwardly extending end walls and side walls for said bin and a top connected to said side walls and end walls, the slope plates of the modular units adjacent the front and back walls of the bin being connected to said walls along the upper edges of said slope plates, plate means extending in a slanting plane from each side of the bin and parallel to the upper edges of said slope plates, said plate means being connected intermediate the upper and lower edges of said slope plates to form enclosures of triangular section, stiffeners fitted into said triangular space at spaced intervals along the length of said space from one side to the other of the bin and, a post having a support distributing cap plate fastened to said plate means at a position substantially midway between each side of the bin and the center plane of the bin, said bin also including a solid material inlet.

7. A bin of the type specified in claim 6 further characterized in that each delivery opening is provided with a downwardly delivering tube having connecting flange thereon and conveyor means is provided along the center plane of the bin and connected to said flanges for collecting and delivering solid material from said bin.

8. A bin for storing dry pulverized material having a bottom, side walls, end walls, and top wall, a loading inlet extending through one of said walls, said bottom being comprised of a plurality of parallel and contiguous modular units that extend across the bin, each modular unit being composed of a pair of oppositely spaced plates which extend the width of said unit and a modular unit conveyor having a delivery end, said conveyor sloping downwardly to said delivery end, said plates being spaced apart from one another at their lower edges and diverging upwardly from their respective lower edges, said plates being sloped downwardly toward the delivery end, the contiguous sloped plates of successive modular units being connected together at their upper edges, plate means connecting said contiguous plates together at a level between their upper and lower edges to form a box beam of triangular cross section extending substantially the length of the sloped plates, and at least two spaced posts connected to said beam to form a support therefor.

9. The bin of claim 8 further characterized in that a plurality of spaced plates of triangular configuration are set in said beam for connecting the contiguous plates and plate means.

References Cited in the file of this patent

UNITED STATES PATENTS

| | | |
|---|---|---|
| 1,112,952 | Watkins | Oct. 6, 1914 |
| 1,503,576 | Willcox | Aug. 5, 1924 |
| 2,609,125 | Schemm | Sept. 2, 1952 |